United States Patent
Quemy

(10) Patent No.: US 11,263,113 B2
(45) Date of Patent: Mar. 1, 2022

(54) CLOUD APPLICATION TO AUTOMATICALLY DETECT AND SOLVE ISSUES IN A SET OF CODE BASE CHANGES USING REINFORCEMENT LEARNING AND RULE-BASED LEARNING

(71) Applicant: International Business Machines Corporation, Armonk, NY (US)

(72) Inventor: Alexandre Quemy, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/914,994

(22) Filed: Jun. 29, 2020

(65) Prior Publication Data
US 2021/0406152 A1    Dec. 30, 2021

(51) Int. Cl.
| | | |
|---|---|---|
| *G06F 11/36* | (2006.01) | |
| *G06F 8/30* | (2018.01) | |
| *G06N 5/04* | (2006.01) | |
| *G06N 20/00* | (2019.01) | |

(52) U.S. Cl.
CPC ............ *G06F 11/3624* (2013.01); *G06F 8/30* (2013.01); *G06N 5/04* (2013.01); *G06N 20/00* (2019.01)

(58) Field of Classification Search
CPC ....... G06F 11/3624; G06F 8/30; G06N 20/00; G06N 5/04
See application file for complete search history.

(56) References Cited

U.S. PATENT DOCUMENTS

| | | | |
|---|---|---|---|
| 10,175,979 B1* | 1/2019 | Elwell | G06F 8/71 |
| 2014/0047413 A1 | 2/2014 | Sheive et al. | |
| 2015/0012448 A1* | 1/2015 | Bleiweiss | G06F 40/289 |
| | | | 705/311 |
| 2018/0300227 A1* | 10/2018 | Bergen | G06F 11/008 |
| 2019/0138300 A1* | 5/2019 | Burli | G06F 8/31 |
| 2019/0266070 A1 | 8/2019 | Dinesh et al. | |
| 2019/0324886 A1 | 10/2019 | Champlin-Scharff et al. | |

OTHER PUBLICATIONS

Yue Jia et al., Finding and fixing software bugs automatically with SapFix and Sapienz, Sep. 13, 2018.
Johannes Bader et al., Getafix: How Facebook tools learn to fix bugs automatically, Nov. 6, 2018.
Anonymous, ip.com, Method and system to evaluate the impact on code changes between workspaces, Jan. 3, 2018.

* cited by examiner

*Primary Examiner* — Phillip H Nguyen
(74) *Attorney, Agent, or Firm* — Terrile, Cannatti & Chambers, LLP; Michael Rocco Cannatti

(57) ABSTRACT

A method, system, and computer program product provide automatic resolution of coding issues by applying code modifications to an application to generate a modified application, and then applying static analytic tools to the modified application to identify coding problems in the modified application related to at least one code modification, where the coding problems are evaluated using a first machine learning model to identify a subset of coding problems meeting a first project relevancy requirement.

14 Claims, 6 Drawing Sheets

CLOUD APPLICATION TO AUTOMATICALLY DETECT AND SOLVE ISSUES IN A SET OF CODE BASE CHANGES USING REINFORCEMENT LEARNING AND RULE-BASED LEARNING

BACKGROUND OF THE INVENTION

Computer programmers and developers increasingly write, test, debug, and maintain computer software, code instructions, and computer programs on collaborative software development systems, such as GitHub, that host software on a repository and that provide distributed development version control whereby changes to a source code or program are tracked or managed to allow different developers to contribute code changes to the original computer software, code instructions, or computer programs. When writing or making changes to computer program to address new or unique technical challenges, programmers often introduce various problems to a codebase with any modification, such as a simple syntax error or a security breach by leaving explicitly a token or passphrase. These problems can be exacerbated as the code is updated or new features are added by different developers who can each contribute different errors with their project modifications. These problems can be addressed with development tools which statically analyze the code (i.e., without running it) to identify potential problems. Since existing tools obey static configurations, they are never optimized to suit a project and often generate some false positive and true negative reports. False positives are usually handled by adding ad-hoc instructions into the code to explicitly instruct a specific tool to avoid throwing an alert or warning. In addition, there can be local false positives generated with static analysis tools that result from being applied to different local projects where different rules, conventions and exceptions are applied such that a problem detected by a tool might be valid in one project but not in another. As a result, static tools are rarely used because developers often end spending more time correcting what the tool wrongfully detected and corrected. Another drawback with existing programming tools is that there are very few tools for automatically solving detected problems. And even when such tools exist, such as lint or linter, they are rarely used because they generate false positives or can event introduce bugs. For example, in Python programs, many linters will reorder imports to create a circular import that prevents the program from even starting. As a result, the existing solutions for detecting a solving coding issues are deficient at a practical and/or operational level by virtue of imposing undue computational cost and processing complexity to achieve poor or suboptimal coding results.

SUMMARY

Broadly speaking, selected embodiments of the present disclosure provide a method, system, and apparatus for automatically detecting and solving issues detected in a set of changes to a codebase by using reinforcement learning and rule-based learning to analyze code changes for relevant problems, to solve the relevant problems with solutions, and to apply the solutions to the codebase. Selected embodiments of the present disclosure provide a code resolution engine having cloud-based services that automate the process of analyzing code modifications from a codebase application to identify problems and to score them for relevance; solving the problems to identify solutions and to score them for confidence; and applying the solutions to fix the problems and update the codebase application. In the code resolution engine, an analysis service is configured to automatically identify problems in the code changes with a plurality of static tools and to apply the identified problems to a first machine learning model which may use a reinforcement learning model to determine which problems are valid for a particular set of code changes. To this end, the developer may provide additional filtering input on the relevance of identified problems for feedback to the first machine learning model. The code resolution engine also includes a problem-solving service that is configured to automatically apply the relevant problems to a second machine learning model which may use a rule engine to identify solutions to the relevant problems and to score them for relevance. To this end, the developer may provide additional filtering input on the relevance of identified solutions for feedback to the second machine learning model. In addition, the code resolution engine includes an application service that is configured to automatically apply the identified, relevant solutions and any additional manual solutions to fix the problems and update the codebase application. At this point, the identified solutions, both automatic and manual, may be provided in feedback to the second machine learning model so that the rule engine may be updated with new rules to provide solutions. By building a rule-based relevance model over all available repositories that is locally adjusted or filtered with the developer's feedback, the present disclosure eliminates the localized nature of problem detection that can arise when static tools are applied locally to different codebase projects using different rules, conventions and exceptions.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
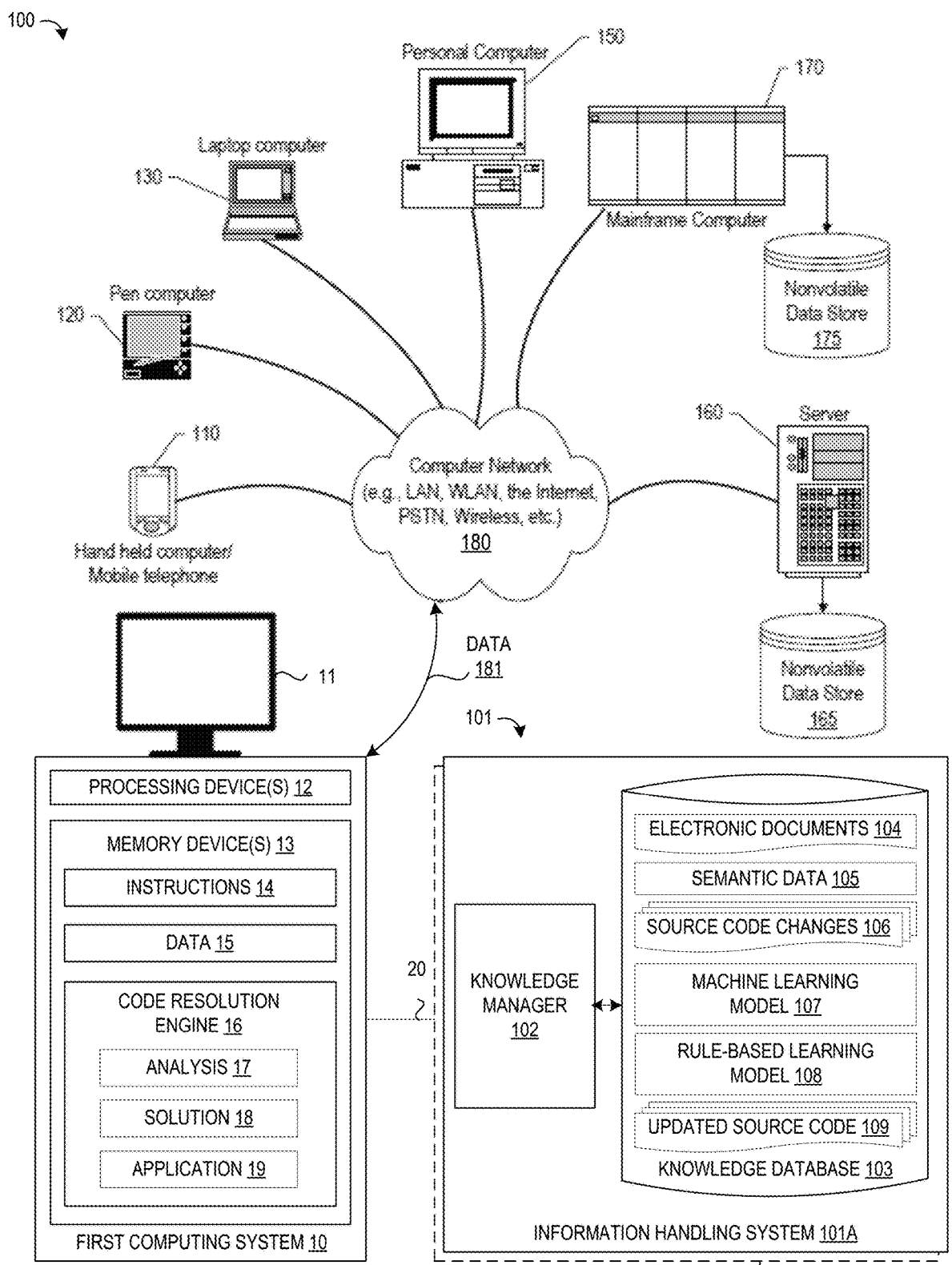
FIG. 1 depicts a system diagram that includes a code resolution engine which uses machine learning models to automatically resolve code issues in accordance with selected embodiments of the present disclosure.

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention. Thus embodied, the disclosed system, a method, and/or a computer program product is operative to improve the functionality and operation of a cognitive computing systems by efficiently providing a cloud-based application for automatically detecting and solving issues in a set of code base changes using reinforcement learning and rule-based learning.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To provide additional details for an improved understanding of selected embodiments of the present disclosure, reference is now made to FIG. 1 which depicts a network environment 100 in which an information handling system and/or computing system includes a code resolution engine 16 which is connected and configured to automatically detect and solve issues identified in code changes to an application codebase by using reinforcement learning and rule-based learning to analyze code changes for relevant problems, to solve the relevant problems with solutions, and to apply the solutions to the codebase. Types of information handling systems range from small handheld devices, such as handheld computer/mobile telephone 110 to large mainframe systems, such as mainframe computer 170. Examples of handheld computer 110 include personal digital assistants (PDAs), personal entertainment devices, such as Moving Picture Experts Group Layer-3 Audio (MP3) players, portable televisions, and compact disc players. Other examples of information handling systems include pen, or tablet, computer 120, laptop or notebook computer 130, personal computer system or workstation 150, server 160, and mainframe computer 170. Other types of information handling systems that are not individually shown in FIG. 1 are represented by information handling system 101. As shown, the various information handling systems can be networked together using computer network 180. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 1 includes separate nonvolatile data stores (more specifically, server 160 utilizes nonvolatile data store 165, mainframe computer 170 utilizes nonvolatile data store 175, and information handling system 101 is embodied with a first computing system 11 which utilizes nonvolatile data store 20).

As described more fully hereinbelow, an example information handling system 101 may be embodied as a server computing system that may include one or more system pipelines 101A, 101B, each of which includes a knowledge manager computing device 102 (comprising one or more processors and one or more memories, and potentially any other computing device elements generally known in the art including buses, storage devices, communication interfaces, and the like) connected to a first computing system 10 for processing information data 20 exchanged therebetween as well as information data 181 received over the network 180 from one or more users at computing devices (e.g., 110, 120, 130). In this way, the computing devices communicate with each other and with other devices or components via one or more wired and/or wireless data communication links, where each communication link may comprise one or more of wires, routers, switches, transmitters, receivers, or the like. As depicted, the information handling system 101 may include or be connected to a first computing device, such as the first computing system 10, that is specifically configured to implement a code resolution engine 16. The configuring of the computing device may comprise the providing of application specific hardware, firmware, or the like to facilitate the performance of the operations and generation of the outputs described herein with regard to the illustrative embodiments. In addition or in the alternative, the configuring of the computing device may include storing software applications in one or more storage devices and loaded into memory of a computing device, such as the information handling system 101, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

To provide input data and/or embeddings, the information handling system 101 may receive data input 181 from the network 180, one or more knowledge databases or corpora 103 which store electronic documents 104, semantic data 105, one or more source code changes 106, one or more machine learning models 107, one or more rule-based learning models 108, updated source code 109, or other input/output data. In selected embodiments, the input source code changes 106 may include a set of code modifications for an application that are made by a developer and stored in the knowledge database 103. In addition, the machine learning model(s) 107 may be stored in the knowledge database 103 to provide any suitable model for evaluating the relevance of identified coding problems detected in the source code changes 106, such as a reinforcement learning model or other suitable generative model. Also, the rule-based learning model(s) 108 may be stored in the knowledge database 103 to provide any suitable model for identifying solutions for the identified coding problems, such as a rule engine. Upon receiving the source code changes 106 and machine learning models 107 (alone or in combination with the rule-based learning models 108) and executing the code resolution engine 16, the first computing device is configured into a specialized computing device specifically configured to implement the mechanisms of the illustrative embodiments for automatically identifying and resolving code issues by applying a set of solution rules the application for storage as updated source code 109, and is not a general-purpose computing device. Moreover, as described hereafter, the implementation of the mechanisms of the illustrative embodiments improves the functionality of the computing device and provides a useful and concrete result that accelerates the resolution of coding issues caused by code changes to an application to efficiently provide more accurate resolution of coding issues without requiring excessive computational resources and/or training time.

In selected embodiments, the information handling system 101 may be implemented with a first computing device 10 that includes a display 11, one or more processing devices 12, and a memory or database storage 13. In the first computing system 10, a processing device 12, such as a natural language processor (NLP), executes program code instructions 14 and data 15 stored in memory 13 for implementing a code resolution engine 16. In operation, the code resolution engine 16 receives, evaluates, and processes input source code changes 106 using an analysis service 17 that automates the process of analyzing the input source code changes 106 to identify problems and to score them for relevance.

In selected embodiments, the analysis service 17 may be implemented as a cloud-based service which identifies or retrieves a set of code modifications or input source code changes 106 for an application, applies the changes to a cloned copy of the application to generate a modified cloned application, identifies code problems or bugs by monitoring the operation of the modified cloned application with a set of static tools, and analyzes the identified code problems or bugs for relevance to the project at hand. When analyzing the input source code changes 106, the analysis service 17 may use a predefined list of static analysis tools and return a list of detected problems which are associated to their location (e.g., file, function, line, column). The analysis service 17 may also use previously gathered developer preferences to assign a relevance score to each identified problem to indicate quantitatively how much the detected problem is really something to solve. In addition, the analysis service 17 may use the machine learning model 107 to learn which set of detected problems are relevant or valid for a particular set of code changes. In selected embodiments, the machine learning model 107 is trained based a code repository/project, and not for each developer. When no preference is collected, the relevance is 100% unless the tool provide a relevance or confidence measure itself (e.g., some unused code detectors returns a confidence level). In addition, the analysis service 17 may use developer feedback regarding the relevance of identified problems to further filter the identified problems and create a set of relevant application problems or bugs, thereby updating the relevance score depending on user feedback.

In addition, the code resolution engine 16 uses a solution service 18 to identify solutions for relevant problems and to score them for confidence. In selected embodiments, the solution service 18 may be implemented as a cloud-based service which identifies possible solutions for the identified code problems or bugs. When analyzing the identified code problems or bugs for solutions, the solution service 18 may use the rule-based learning model 108 or other suitable machine-learning model to identify a set of solution rules corresponding to the identified code problems/bugs. For example, the rule-based learning model 108 may use an association rule engine that learns from developer feedback to apply rules that solve certain problems. Given a problem and its location, the rule engine looks for a rule that can be applied to solve it. If there is a rule, it is applied to identify a solution and to assign a relevance to the solution. However, it will be appreciated that not all problems can be automatically solved. To provide a good start, the rule engine is populated with tools that can automatically handle certain problems (e.g., linter to solve code style issues). In addition, the solution service 18 may use developer feedback regarding the relevance of identified solutions or otherwise apply a solution relevance threshold to further filter the identified solutions and create a set of relevant solutions.

The code resolution engine 16 also uses an application service 19 to apply the solutions to fix the problems and update the codebase application. In selected embodiments, the application service 19 may be implemented as a cloud-based service and/or developer workstation-based service where each identified solution is applied to a locally cloned copy of the modified cloned application, thereby creating a first modified cloned application having a first change or modification implementing the identified solution(s). For any identified code problem/bug that does not have a corresponding relevant solution identified, the application service 19 may prompt the developer to manually solve the problem, and any resulting manual solution may be applied to the locally cloned copy of the modified cloned application, thereby creating a second modified cloned application having a second change or modification implementing the manual solution. The application service 19 may then send the first and/or second modified cloned application to a central code repository for review and/or merger where the identified solutions and/or manual solutions may be identified and used to update the rule-based learning model 108 or other suitable machine-learning model that is used to identify solutions.

As will be appreciated, the machine learning model 107 and/or rule-based learning model 108 provide mechanisms for maximizing learning efficiency when generating recommendations at the analysis service 17 and solution service 18 by learning from all developers of a given project from their answers. The model(s) 107, 108 also enforce common standards across a project rather than at a developer level while leaving different projects having different approaches of solving problems. With this optic of project standardization, the model(s) 107, 108 can also learn from code reviews (e.g., from more experienced developers pointing out problems in the code).

Figure 2:
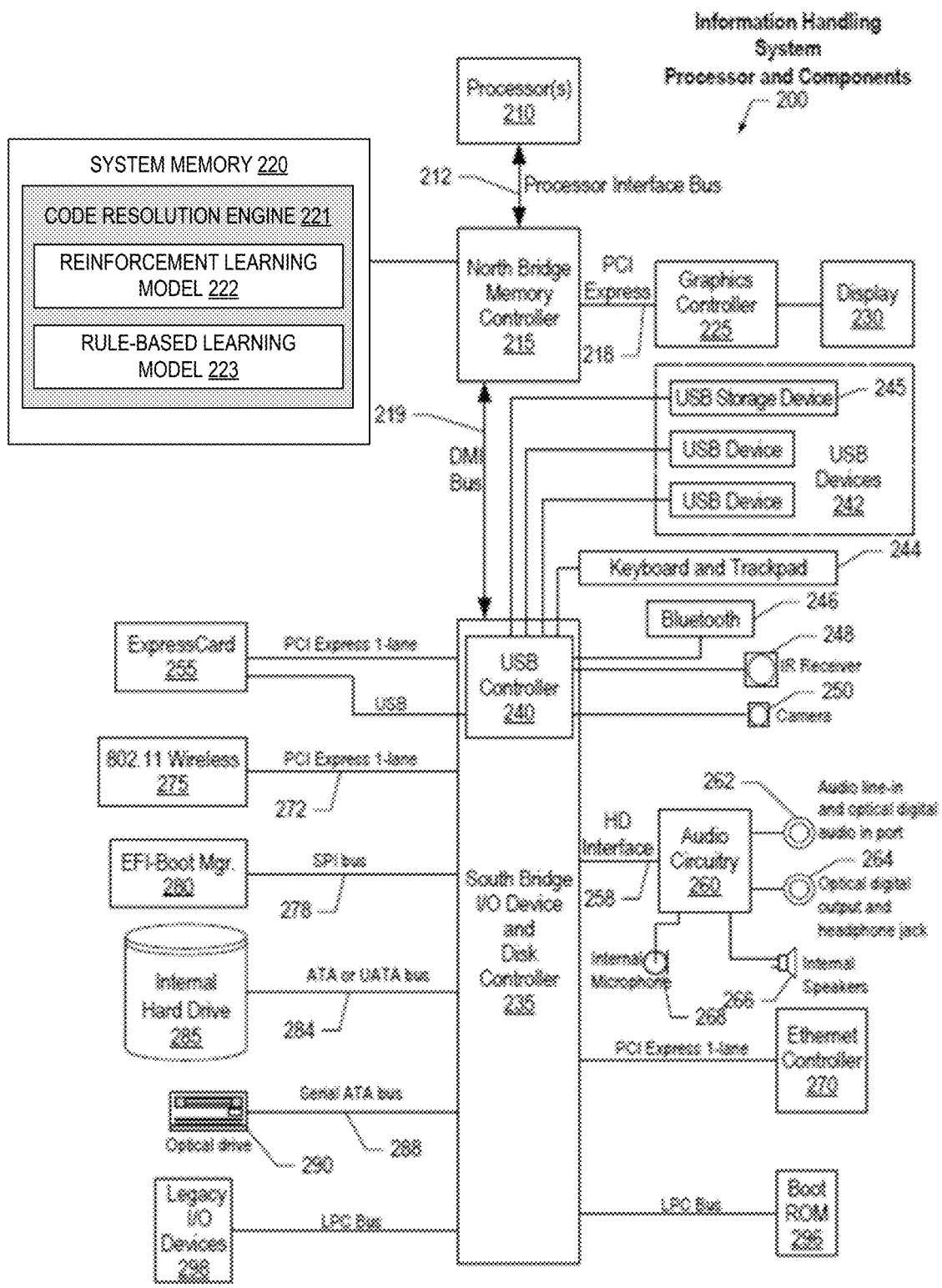
FIG. 2 is a block diagram of a processor and components of an information handling system such as those shown in FIG. 1.

To provide additional details for an improved understanding of selected embodiments of the present disclosure, reference is now made to FIG. 2 which illustrates an information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. In the system memory 220, a variety of programs may be stored in one or more memory devices, including a code resolution engine module 221 which may be invoked for automatically detecting and solving issues detected in a set of changes to a codebase by using one or more machine learning models to analyze code changes for relevant problems, to solve the relevant problems with solutions, and to apply the solutions to the codebase. To this end, the system memory 220 may include a first machine learning model 222 (such as a reinforcement learning model) and a second machine learning model 223 (such as a rule-based learning model) which are used in a cloud-based application to learn which set of detected problems are valid for a particular set of code changes and to propose and apply solutions for solving the set of selected problems so that the learning models 222, 223 learn from how the developer finally fixed the problem in order to improve later its way of handling similar problems. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH), is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. Other components often included in Southbridge 235 include a Direct Memory Access (DMA) controller, a Programmable Interrupt Controller (PIC), and a storage device controller, which connects Southbridge 235 to non-volatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etc.

Wireless Local Area Network (LAN) device 275 connects to Southbridge 235 via the PCI or PCI Express bus 272. LAN device 275 typically implements one of the IEEE 802.11 standards for over-the-air modulation techniques to wireless communicate between information handling system 200 and another computer system or device. Extensible Firmware Interface (EFI) manager 280 connects to Southbridge 235 via Serial Peripheral Interface (SPI) bus 278 and is used to interface between an operating system and platform firmware. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

While any suitable collaborative development platform may be used in connection with the present disclosure, an example collaborative software development platform is the GitHub platform which enables cooperative development of projects and communication with consumers. In the example GitHub platform, a consumer may open a discussion thread or issue on the platform to report a bug, request software features, or ask questions, for example. A user or developer (e.g., software engineer) may then address the issue by, for example, making a copy of the software at issue and writing new features for the software at issue. The platform tracks changes made to the software at issue. The platform further enables a user to open a pull request to share proposed changes with other members of the platform (e.g., teammates). The platform tracks contributions from the other members and enables users to sink up to a repository to see the changes/edits of others. Webhooks provide a way for notifications to be delivered to an external web server whenever certain actions occur on a repository or for an organization. In this context, one or more of the code resolution engine services 17-19 may interact with the software by providing the developer with specified git subcommands for analyzing commits for problems, finding relevant solutions for the problems identified in the commits, and applying relevant solutions to the identified problems from the commits. In addition, the code resolution engine services 17-19 may provide interactive feedback opportunities for the developer/user to interact with the application to tell if a detected problem is relevant or not (e.g., to increase or lower the relevance of an identified problem at the same location). This interactive feedback over time can update the machine learning models to provide more and more relevant problems and avoid proposing non-relevant problems, without having to explicitly stating it in the code base. In addition, the code resolution engine services 17-19 may provide interactive feedback opportunities for the developer/user to interact with the application to tell if a solution is itself relevant or not. For example, the interactive feedback from the developer can lower the probability of providing a non-fitting solution to the developer, such as rejecting a reordering import solution from being proposed in an application because the developer knows it will break the software.

Figure 3:
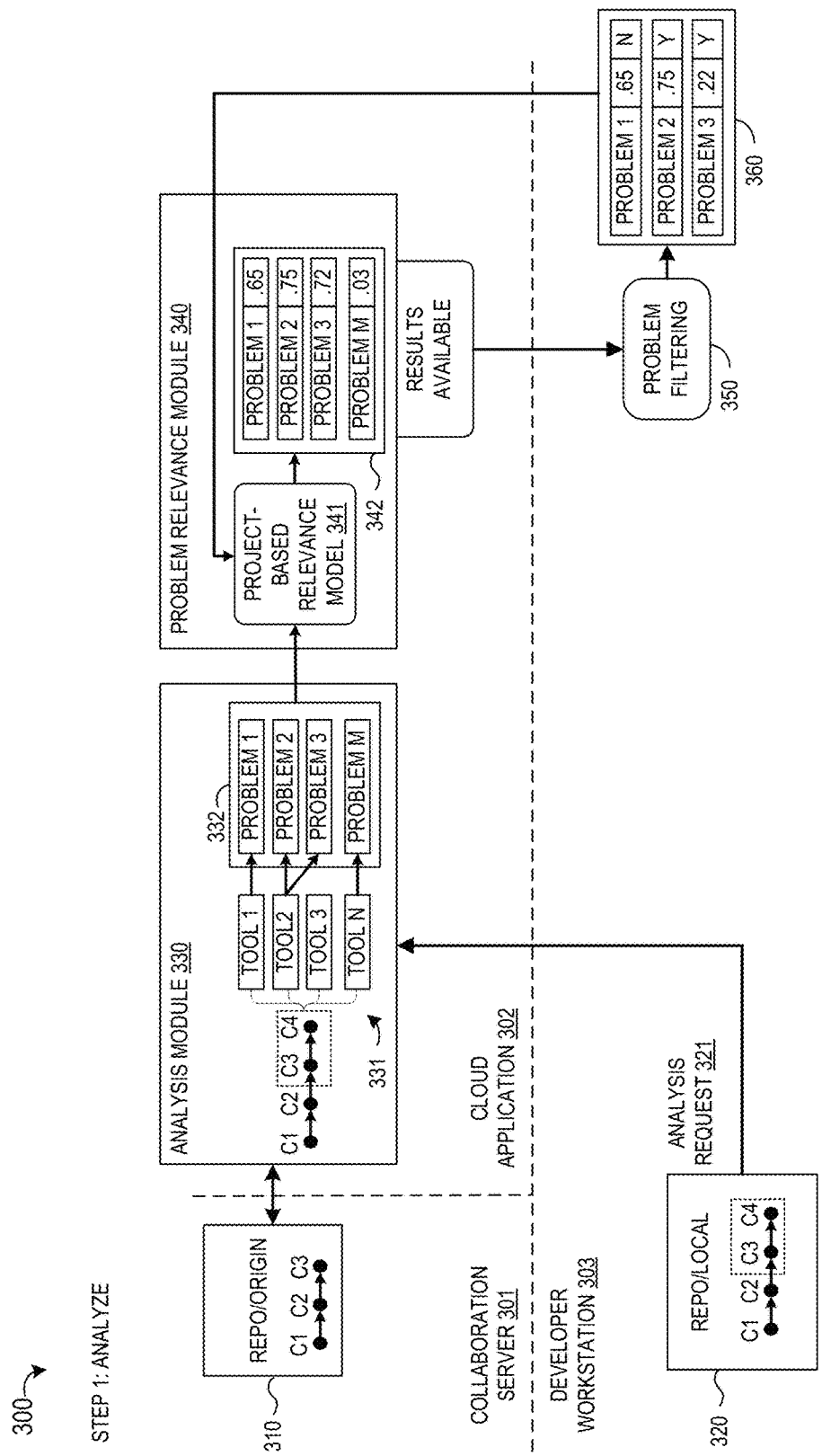
FIG. 3 is a simplified illustration of a collaborative development platform where input code changes are analyzed to identify and score relevant problems in accordance with selected embodiments of the present disclosure.

To provide additional details for an improved understanding of selected embodiments of the present disclosure, reference is now made to FIG. 3 which depicts a simplified illustration 300 of a collaborative development platform which includes a collaboration server 301, cloud-based application server 302, and developer workstation 303. The collaboration server 301 stores the application in the original application code repository 310, where the original application includes a series of previously-entered code changes or versions C1, C2, C3 that are managed, tracked, and stored as revisions of the application. At the developer workstation 303, the developer may introduce new code changes (e.g., C4) which are to be made to the original application code repository 310 stored at the collaboration server 301. However, a first step in resolving code issues created by the new code changes before updating the original application code is to analyze a set of code-based changes to the application that are stored in a local application code repository 320. In particular, after introducing new changes (C4) to the application, the developer may issue an analysis request 321 to an analysis module 330 at the cloud-based application server 302. While any suitable command message format may be used for the analysis request 321, an example command message format is a defined "git patch analyze" subcommand to analyze a code change commit since most developers use the GitHub system for development projects. In response to the analysis request 321, a patch of modifications in the local application code repository 320 is collected by the developer workstation 303 and sent to the cloud-based application server 302.

Using a previously-provided developer token, the cloud-based application server 302 clones the original application code repository 310 (C1-C3) from the collaboration server 301 and applies the patch of modifications (C4) on its local clone. The local clone (C1-C4) is then analyzed by the analysis module 330 which applies one or more predefined tools 331, such as static analysis tools (e.g., Tool 1-Tool N). Examples of the tools 331 include, but are not limited to password detector tools, token detector tools, undefined behavior detector tools, missing variable detector tools, linter tools, or any suitable source code analysis tool for flagging programming errors, bugs, stylistic errors, suspicious constructs, code smells, or the like. After applying the tools 331 to the patch of modifications (C3-C4), the analysis module 330 generates a list of one or more problems 332 (e.g., Problem 1-Problem M) in the patch of modifications. The identified problems 332 are then collected and forwarded to the problem relevance module 340 which uses a machine learning model 341, such as a reinforcement learning model, to determine which identified problems are relevant to the project and to assign to each problem its relevance based on the problem context. For example, after the developer introduces a new code change (e.g., C4) to a locally stored application copy 320, the analysis request 321 prompts the analysis module 330 to identify candidate problems 332 (Problems 1-M) which are then forwarded the problem relevance module 340 which generates a list of candidate problems 342 (Problems 1-M) with quantified relevance scores, such that Problem 1 has an assigned relevancy score of 0.65, Problem 2 has an assigned relevancy score of 0.75, Problem 3 has an assigned relevancy score of 0.72, and Problem M has an assigned relevancy score of 0.03.

At this point, the developer may provide additional input on the relevance of identified problems for feedback to the first machine learning model 341. For example, a problem filtering module 350 at the developer workstation 303 may retrieve and display the list of candidate problems 342, either by automatically displaying the list 342 or in response to any suitable command message, such as a "git patch solve" subcommand. In selected embodiments, the entire list of candidate problems 342 is retrieved for display, though in other embodiments, only a subset of the list of candidate problems 342 (e.g., Problems 1-3) which meet a minimum relevance threshold is retrieved. Through interactive commands, the developer may provide feedback on whether the identified problems are relevant or not by having the developer assign a simple "Yes" or "No" label to each problem. For example, the developer can enter a first message (e.g., Y) if the problem is relevant to the project, and can enter a second message (e.g., N) if the problem is not relevant to the project. As a result, a list of candidate problems 360 is generated that includes both project relevance scores and developer feedback for each candidate problem (Problem 1-3). The resulting list 360 may be sent back to the problem relevance module 340 for updating the project-based relevance model 341 which learns from the developer feedback.

Figure 4:
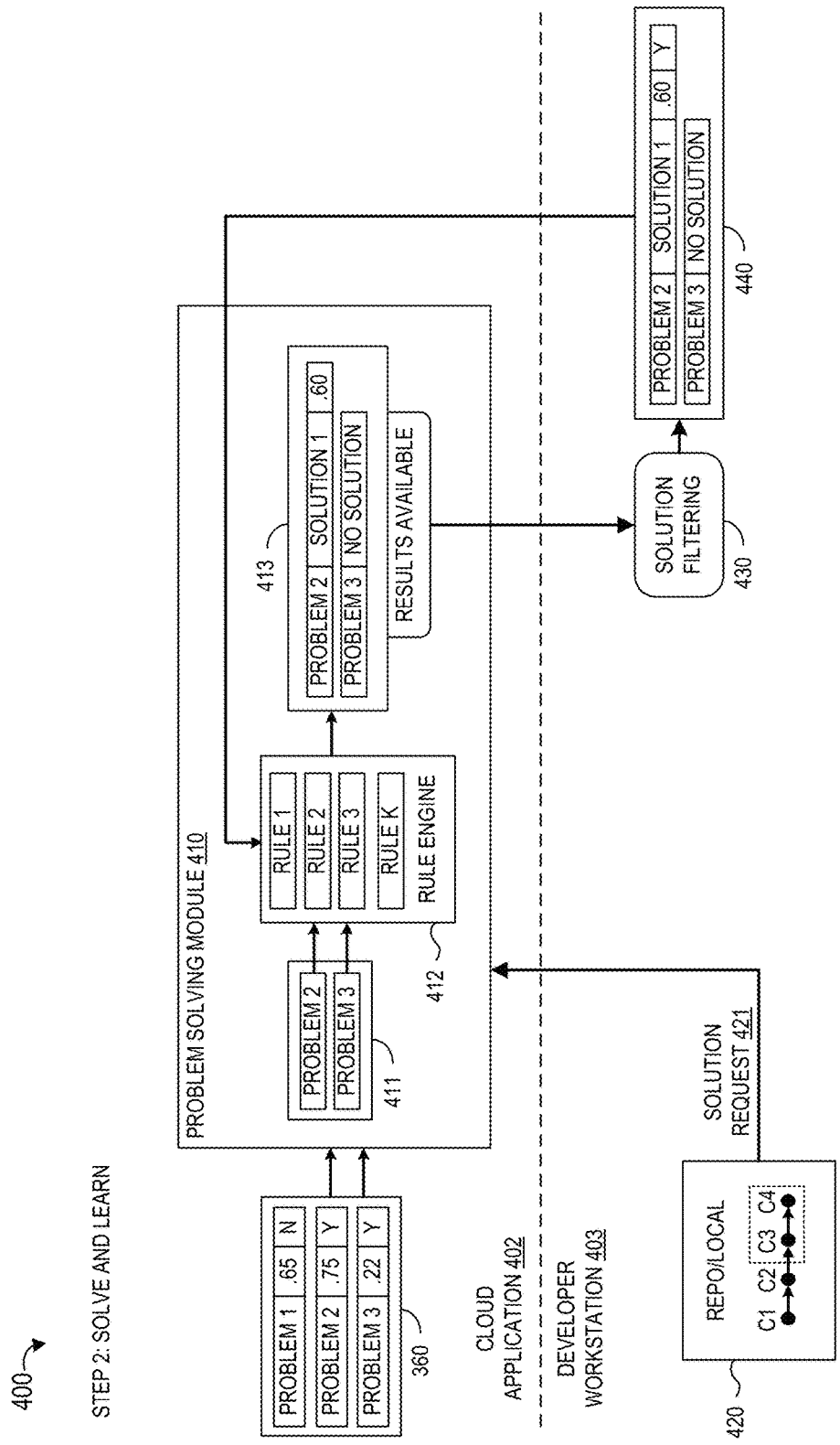
FIG. 4 is a simplified illustration of a collaborative development platform where identified problems from input code changes are processed to identify and score relevant solutions in accordance with selected embodiments of the present disclosure.

To provide additional details for an improved understanding of selected embodiments of the present disclosure, reference is now made to FIG. 4 which depicts a simplified illustration 400 of the collaborative development platform where the cloud-based application server 402 and developer workstation 403 perform a second step in resolving code issues by identifying and scoring relevant solutions to the identified problems and learning from additional feedback from the user/developer. In particular, a developer at the developer workstation 403 may issue a solution request 421 to the problem solving module 410 to solve problems identified in the set of code-based changes stored in the local application code repository 420. While any suitable command message format may be used for the solution request 421, an example command message format is a defined "git patch solve" subcommand to analyze a code change commit since most developers use the GitHub system for development projects. In response to the solution request 421, the problem solving module 410 retrieves or generates the list of candidate problems 360 having project relevance scores and developer feedback identifying the most relevant solutions. Though now shown, the problem solving module 410 may retrieve solutions that have uncertain relevance scores for which the model 341 is not certain if it is relevant or not in order to keep learning. At the problem solving module 410, the most relevant problems 411 may be processed to identify candidate solutions. For example, the identified problems 411 which were flagged by the developer as relevant (e.g., Problem 2 and Problem 3) may be sent to a rule engine 412 which applies a set of rules (e.g., Rule 1-Rule K) to the problems (e.g., Problem 2 and Problem 3) to identify any available solutions for the identified problems 411. For each problem (e.g., Problem 2), the rule engine 412 seeks to identify a solution (e.g., Solution 1) that can be applied to solve the problem. In addition, the identified solutions can be further processed by the problem solving module 410 to assign a relevance score to each solution. Though not shown, it will be appreciated that another machine learning model, such as a reinforcement learning model, may be used to determine which identified solutions are relevant to the project and to assign to each solution its relevance based on the problem context. For example, after an initial list of relevant solutions are generated, the problem solving module 410 generates a list of candidate problems 413 (Problem 2 and Problem 3) with quantified relevance or confidence scores, such that the Solution 1 for Problem 2 is assigned a relevancy/confidence score of 0.60, though in other embodiments, the problem relevancy score may be used instead or in combination with the solution relevancy/confidence score. For any problem (e.g., Problem 3) where no solution is generated by the rule engine 412, the problem solving module 410 may include an indication in the list of candidate problems 413 that "No Solution" is found.

At this point, the developer may provide additional input on the relevance of identified solutions for feedback to the rule engine 412. For example, a solution filtering module 430 at the developer workstation 403 may retrieve and display the list of candidate solutions 413, either by automatically displaying the list 413 or in response to any suitable command message, such as a "git patch apply" subcommand. In selected embodiments, the entire list of candidate solutions 413 is retrieved for display, though in other embodiments, only a subset of the list of candidate solutions 413 which meet a minimum relevance or confidence threshold is retrieved. Through interactive commands, the developer may provide feedback on whether the identified solutions are relevant or not by having the developer assign a simple "Yes" or "No" label to each solution. For example, the developer can enter a first message (e.g., Y) if the solution is relevant to the project, and can enter a second message (e.g., N) if the solution is not relevant to the project. As a result, a list of candidate solutions 440 is generated that includes both project relevance scores and developer feedback for each candidate solution. The resulting list 440 may be sent back to the problem solving module 410 for updating the rule engine 412 which learns from the developer feedback.

Figure 5:
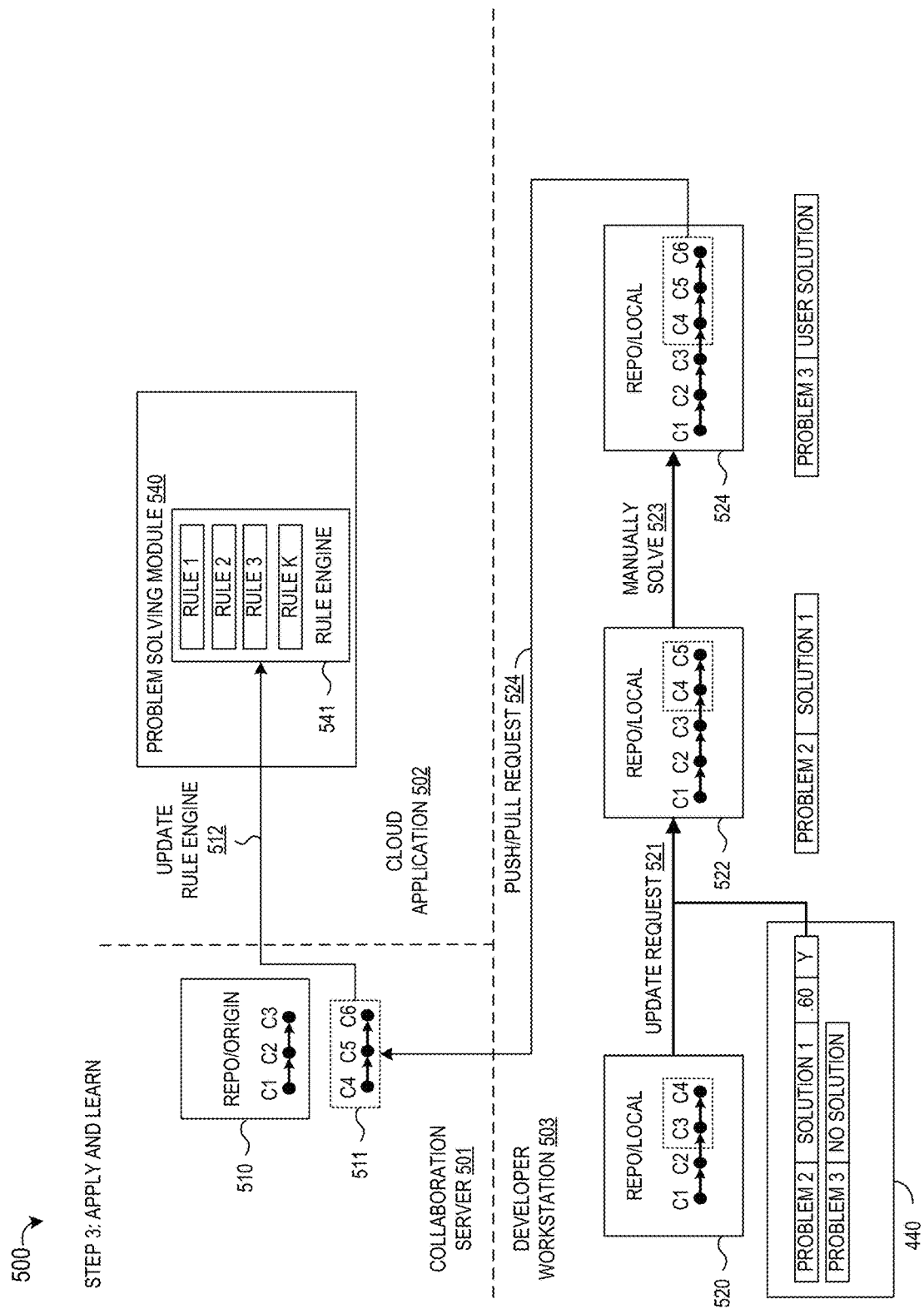
FIG. 5 is a simplified illustration of a collaborative development platform where identified solutions are applied to update the application code in accordance with selected embodiments of the present disclosure.

To provide additional details for an improved understanding of selected embodiments of the present disclosure, reference is now made to FIG. 5 which depicts a simplified illustration 500 of the collaborative development platform where the collaboration server 501, cloud-based application server 502, and developer workstation 503 perform a third step in resolving code issues by applying relevant code fix solutions to update the original application, thereby addressing identified problems and learning from additional feedback from the user/developer. In particular, a developer at the developer workstation 503 may issue a solution request 521 to initiate a sequence for applying identified and/or manual solutions to solve problems identified in the set of code-based changes stored in the local application code repository 520. While any suitable command message format may be used for the solution request 521, an example command message format is a defined "git patch solve" subcommand to apply a code change solution to the original application code repository 510.

At the developer workstation 503, the initiated sequence for applying solutions may include having the developer apply the identified relevant solutions from the list of candidate solutions 440. For example, an automatically generated solution (e.g., Solution 1 to Problem 2) may be applied to define a commit (e.g., commit C5) that is added locally on the developer repository clone 522 of the modified cloned application (e.g., C1-C5). In addition, the initiated sequence for applying solutions may include a manual solution process 523 where the developer manually solves any problem(s) (e.g., Problem 3) where no solutions have been identified by defining a commit (e.g., commit C6) that is also added locally on the developer repository clone 524 of the modified cloned application (e.g., C1-C6).

As will be appreciated, any desired sequencing or ordering may be used at the developer workstation 503 when applying the automatically identified solutions and manually generated solutions. In whatever sequence is used, the final application modification commits (C4-C6) can be sent to collaboration server 501 for updating the original application code repository 510 using any suitable command, such as a standard git push/pull subcommand to open a pull request for review/merge. At the collaboration server 501, a preinstalled webhook can automatically detect the new pull request and send a rule engine update command 512 to the cloud application server 502 with associated information, including the commits C4-C6 and their patches. Knowing the history of git patch, the problem solving module 540 can connect the fact that the commit C6 is manually solving the problem that had no automated solution earlier. By analyzing the developer changes to solve those issues, the rule engine 541 can extract new rules to be added from the rule engine update command 512.

Figure 6:
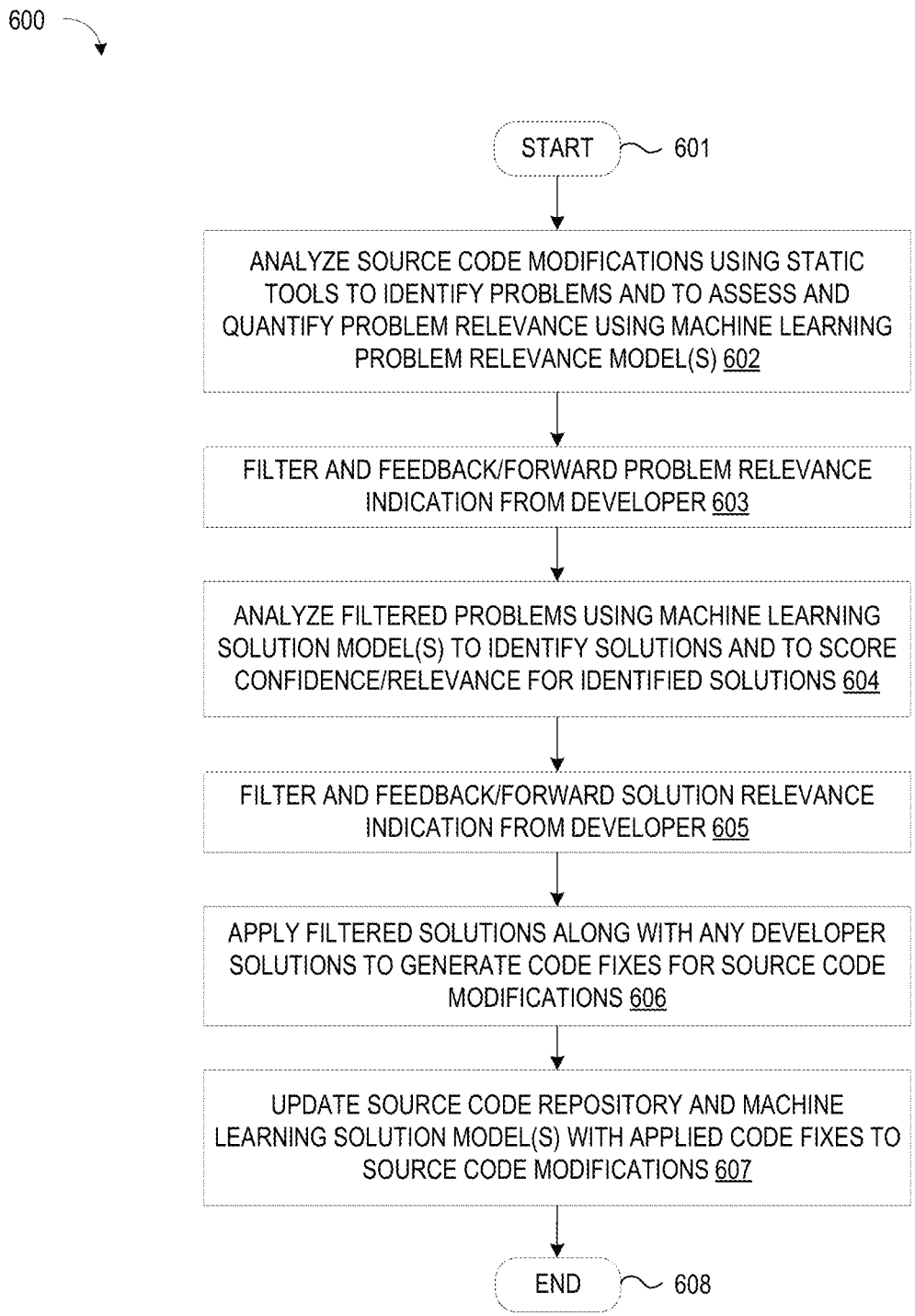
FIG. 6 illustrates a simplified flow chart showing the logic for automatically identifying and resolving code issues in accordance with selected embodiments of the present disclosure.

To provide additional details for an improved understanding of selected embodiments of the present disclosure, reference is now made to FIG. 6 which depicts a high-level execution flow chart 600 showing the logic showing the logic for automatically identifying and resolving code issues. As will be appreciated, the depicted execution workflow 600 may be implemented in whole or in part with a data processing system, such as the first computing system 10, server computing system 101, or other cognitive computing system. However implemented, the execution workflow 600 receives and source code modifications or patches that may be created by the program developer to change an original application source code.

At step 602, the source code modifications or patches are automatically analyzed to identify one or more problems in the source code modifications and to quantify the relevance of any problems to the project at hand. In selected embodiments, the analysis at step 602 may be performed at one or more cloud-based application server modules for analyzing and evaluating the problems for relevance to the developer's project. For example, the processing at step 602 may apply one or more static analysis tools at an analysis module to identify problems with the source code patches and to assess and quantify problem relevance metrics using one or more machine learning problem relevance models. To analyze the source code patches, they may be applied to a cloned copy of the original application source code at a cloud-based application prior to applying the static analysis tools and generating an initial list of code problems. Once generated, the initial list of code problems may be evaluated at a problem relevance module which uses a first machine learning model to assign to each problem a corresponding relevance metric based on the problem context. In quantifying the problem relevance, an additional input to the analysis step 602 may be a relevance threshold limit value that may be retrieved from the knowledge base or memory.

At step 603, the initial list of code problems may be filtered with additional relevance indications provided in feedback by the developer, and then provided in feedback to the first machine learning model and/or fed forward to the problem solving module. In selected embodiments, the analysis at step 603 may be performed at one or more cloud-based application server modules which interact with a developer workstation to display the most relevant problems to the developer based on the computed relevance metrics, and to ask the developer to assign feedback on the relevance of the problems to the developer's project, thereby generating filtered problems for additional processing.

At step 604, the relevance-filtered problems are automatically analyzed to identify one or more solutions for identified problems in the source code modifications and to quantify the relevance of any problems to the project at hand. In selected embodiments, the analysis at step 604 may be performed at one or more cloud-based application server modules for analyzing and evaluating relevant problems to find solutions. For example, the processing at step 604 may apply one or more rules from an association rule engine at a problem solving module to generate solutions for the relevance-filtered problems and to assess and quantify solution relevance or confidence metrics using one or more machine learning problem relevance models. In particular, the relevance-filtered solutions may be evaluated at a problem solving module which uses a second machine learning model to assign to each solution a corresponding relevance or confidence metric. In quantifying the solution relevance, an additional input to the analysis step 604 may be a relevance threshold limit value that may be retrieved from the knowledge base or memory.

At step 605, the initial list of solutions may be filtered with additional relevance indications provided in feedback by the developer, and then provided in feedback to the second machine learning model in the problem solving module. In selected embodiments, the analysis at step 605 may be performed at one or more cloud-based application server modules which interact with a developer workstation to display the most relevant solution to the developer based on the computed relevance/confidence metrics, and to ask the developer to assign feedback on the relevance of the solutions to the developer's project, thereby generating filtered solutions for additional processing.

At step 606, the relevance-filtered solutions are applied along with any solutions manually created by the developer to generate code fixes which address the identified problem(s) in the source code modifications. In selected embodiments, the processing at step 606 may be performed at the developer workstation by using the relevance-filtered solutions to generate one or more code fix commits for modifying a cloned copy of the original application source code, thereby generating a sequence of one or more code fix changes to the original application source code. In particular, the automatically generated solutions identified for each relevant problem may be applied locally at the developer's repository clone of the original application source code to provide an automatically generated code fix. In addition, the developer may manually generate solutions for relevant problems that have no automatically generated solution that are also applied locally at the developer's repository clone of the original application source code to provide a manually generated code fix.

At step 607, the original application code repository is updated with the code fixes and the machine learning solution model(s) are updated to reflect the code fixes for the source code modifications. In selected embodiments, the update processing at step 606 may be performed at a collaboration server which interacts with one or more cloud-based application server modules to update the original application code repository and the machine learning solution model(s). For example, the processing at step 607 may automatically detect any requested changes to the original application code repository, apply the requested changes to the original application source code, and update the association rule-based solution learning model to reflect the code fix solutions that were implemented. At step 608, the process ends.

By now, it will be appreciated that there is disclosed herein a system, method, apparatus, and computer program product for resolving code issues within an application. In selected embodiments, an information handling system having a processor and a memory applies a set of code modifications to the application to generate a modified application. In addition, the information handling system applies one or more static analytic tools to the modified application to identify one or more coding problems in the modified application related to at least one code modification. In addition, the information handling system evaluates the one or more coding problems using a first machine learning model to identify a subset of coding problems meeting a first project relevancy requirement. In selected embodiments, first machine learning model is a reinforcement learning model or neural network model for identifying coding problems meeting the first project relevancy requirement, and may be trained with problem relevancy feedback from a developer. In addition, the first project relevancy requirement may be a first specified relevancy threshold for a developer-specified project against which the coding problems are evaluated. In other embodiments, the information handling system may present the subset of coding problems to a developer to receive project relevancy feedback to update or to train the first machine learning model. In selected embodiments of the system, method, apparatus, and computer program product for resolving code issues, the information handling system also applies one or more association rules to the subset of coding problems to identify a first set of coding solutions for at least a first coding problem in the subset of coding problems, and then evaluates the first set of solutions using a second machine learning model to identify a subset of the first set of coding solutions meeting a second project relevancy requirement. In selected embodiments, the second machine learning model is a reinforcement learning model or neural network model for identifying coding solutions meeting the second project relevancy requirement, and may be trained with solution relevancy feedback from a developer. In addition, the second project relevancy requirement may be a second specified relevancy threshold for a developer-specified project against which the coding solutions are evaluated. After identifying the subset of coding problems, the information handling system may also apply the set of code modifications to a cloned copy of the application to generate a cloned copy of the modified application. Subsequently, the information handling system applies the subset of the first set of coding solutions meeting the second project relevancy requirement to update the cloned copy of the modified application with changes to solve at least one of the coding problems in the cloned copy of the modified application. In addition, the information handling system may use the subset of the first set of coding solutions to update the one or more association rules or to train the second machine learning model.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method for resolving code issues within an application, the method comprising:
applying, by an information handling system comprising a processor and a memory, a set of code modifications to the application to generate a modified application;
applying, by the information handling system, one or more static analytic tools to the modified application to identify one or more coding problems in the modified application related to at least one code modification;
evaluating, by the information handling system, the one or more coding problems using a first machine learning model to identify a subset of coding problems meeting a first project relevancy requirement;
applying, by the information handling system, one or more association rules to the subset of coding problems to identify a first set of coding solutions for at least a first coding problem in the subset of coding problems;
evaluating, by the information handling system, the first set of coding solutions using a second machine learning model to identify a subset of the first set of coding solutions meeting a second project relevancy requirement;
applying, by the information handling system, the set of code modifications to a cloned copy of the application to generate a cloned copy of the modified application;
applying, by the information handling system, the subset of the first set of coding solutions meeting the second project relevancy requirement to update the cloned copy of the modified application with changes to solve at least one of the coding problems in the cloned copy of the modified application; and
using the subset of the first set of coding solutions to update the one or more association rules or to train the second machine learning model.

2. The computer-implemented method of claim 1, further comprising:
presenting, by the system, the subset of coding problems to a developer to receive project relevancy feedback to update or to train the first machine learning model.

3. The computer-implemented method of claim 1, where the first machine learning model comprises a reinforcement learning model or neural network model for identifying coding problems meeting the first project relevancy requirement.

4. The computer-implemented method of claim 3, where the first machine learning model is trained with problem relevancy feedback input from a developer.

5. The computer-implemented method of claim 1, where the second machine learning model comprises a reinforcement learning model or neural network model for identifying coding solutions meeting the second project relevancy requirement.

6. The computer-implemented method of claim 5, where the second machine learning model is trained with solution relevancy feedback input from a developer.

7. The computer-implemented method of claim 1, where the first project relevancy requirement comprises a first specified relevancy threshold for a developer-specified project and where the second project relevancy requirement comprises a second specified relevancy threshold for the developer-specified project.

8. An information handling system comprising:
one or more processors;
a memory coupled to at least one of the processors;
a set of instructions stored in the memory and executed by at least one of the processors to automatically resolve code issues within an application, wherein the set of instructions are executable to perform actions of:
applying, by the system, a set of code modifications to the application to generate a modified application;
applying, by the system, one or more static analytic tools to the modified application to identify one or more coding problems in the modified application related to at least one code modification;
evaluating, by the system, the one or more coding problems using a first machine learning model to identify a subset of coding problems meeting a first project relevancy requirement;
applying, by the system, one or more association rules to the subset of coding problems to identify a first set of coding solutions for at least a first coding problem in the subset of coding problems;
evaluating, by the system, the first set of coding solutions using a second machine learning model to identify a subset of the first set of coding solutions meeting a second project relevancy requirement;
applying, by the system, the set of code modifications to a cloned copy of the application to generate a cloned copy of the modified application;
applying, by the system, the subset of the first set of coding solutions meeting the second project relevancy requirement to update the cloned copy of the modified application with changes to solve at least one of the coding problems in the cloned copy of the modified application; and
using the subset of the first set of coding solutions to update the one or more association rules or to train the second machine learning model.

9. The information handling system of claim 8, where the first machine learning model comprises a reinforcement learning model or neural network model for identifying coding problems meeting the first project relevancy requirement and where project relevancy feedback from a developer on the subset of coding problems is used to update or to train the first machine learning model.

10. The information handling system of claim 8, where the second machine learning model comprises a reinforcement learning model for identifying coding solutions meeting the second project relevancy requirement and where project relevancy feedback from a developer on subset of the first set of coding solutions is used to update or to train the second machine learning model.

11. The information handling system of claim 8, where the second machine learning model comprises a neural network model for identifying coding solutions meeting the second project relevancy requirement and where project relevancy feedback from a developer on subset of the first set of coding solutions is used to update or to train the second machine learning model.

12. The information handling system of claim 8, wherein the set of instructions are executable to perform the actions of:
presenting, by the system, the subset of coding problems to a developer to receive project relevancy feedback on the subset of coding problems; and
updating, by the system, the first machine learning model with the project relevancy feedback from the developer.

13. The information handling system of claim 8, wherein the set of instructions are executable to perform the actions of:

presenting, by the system, the subset of the first set of coding solutions to a developer to receive project relevancy feedback on the subset of the first set of coding solutions; and updating, by the system, the second machine learning model with the project relevancy feedback from the developer.

14. A computer program product stored in a computer readable storage medium, comprising computer instructions that, when executed by a processor at an information handling system, causes the system to automatically resolve code issues within an application by:

applying a set of code modifications to the application to generate a modified application;

applying one or more static analytic tools to the modified application to identify one or more coding problems in the modified application related to at least one code modification;

evaluating the one or more coding problems using a first machine learning model to identify a subset of coding problems meeting a first project relevancy requirement;

applying one or more association rules to the subset of coding problems to identify a first set of coding solutions for at least a first coding problem in the subset of coding problems;

evaluating the first set of coding solutions using a second machine learning model to identify a subset of the first set of coding solutions meeting a second project relevancy requirement;

applying the set of code modifications to a cloned copy of the application to generate a cloned copy of the modified application;

applying the subset of the first set of coding solutions meeting the second project relevancy requirement to update the cloned copy of the modified application with changes to solve at least one of the coding problems in the cloned copy of the modified application; and using the subset of the first set of coding solutions to update the one or more association rules or to train the second machine learning model.

\* \* \* \* \*